United States Patent [19]
Aho

[11] Patent Number: 4,696,382
[45] Date of Patent: Sep. 29, 1987

[54] FRONT WHEEL HUB CLUTCH
[76] Inventor: Richard Aho, 5551 NE. 33rd Ave., Fort Lauderdale, Fla. 33308
[21] Appl. No.: 885,582
[22] Filed: Jul. 14, 1986
[51] Int. Cl.$^4$ .......................... F16D 1/06; F16D 11/00
[52] U.S. Cl. ................................ 192/67 R; 192/89 B; 192/93 A; 192/95; 403/1
[58] Field of Search ................. 192/67 R, 89 R, 89 B, 192/93 R, 93 A, 95; 403/1

[56] References Cited
U.S. PATENT DOCUMENTS

| | | | |
|---|---|---|---|
| 3,442,361 | 5/1969 | Hegar | 192/67 R |
| 3,718,213 | 2/1973 | Hegar et al. | 192/67 R |
| 3,753,479 | 8/1973 | Williams | 192/95 |
| 4,116,320 | 9/1978 | Quilliam | 192/93 A |
| 4,185,727 | 1/1980 | Yamaguchi et al. | 192/89 B |
| 4,212,557 | 7/1980 | Overbeek | 192/67 R |

FOREIGN PATENT DOCUMENTS

| | | | |
|---|---|---|---|
| 653996 | 12/1962 | Canada | 192/67 R |
| 77956 | 6/1977 | Japan | 192/67 R |

Primary Examiner—Rodney H. Bonck
Assistant Examiner—David A. Testardi
Attorney, Agent, or Firm—Joseph Zallen

[57] ABSTRACT

A clutch to permit engagement and disengagement of a splined axle with a power drive means which has an inner axle hub, internally splined to engage with said axle and externally splined, and a body with internal ridges and grooves and external grooves and ridges connectable to a power source, comprising a clutch ring having exterior ridges and grooves, interior ridges and grooves and a plurality of rearwardly extending ramps; wherein said exterior ridges and grooves are engaged with said body internal ridges and grooves; a movable control body having a plurality of forwardly extending leaf springs registerable with said ramps; and a spring forward of said clutch ring; whereby rotation of said body causes said clutch ring to move forward so that its interior ridges and grooves engage the inner axle hub while reverse rotation causes the clutch ring to move rearward so as to disengage.

1 Claim, 8 Drawing Figures

FRONT WHEEL HUB CLUTCH

BACKGROUND OF INVENTION

This invention relates to a front wheel hub clutch. In particular it relates to a front wheel hub clutch which is simpler and more inexpensive to construct than prior art devices.

A front wheel hub clutch is described in U.S. Pat. No. 3,442,361 and points out that a front wheel hub clutch is used for the front wheels of vehicles to establish or interrupt a driving connection between the engine and the front wheels so that the operator optionally has two or four wheel drive. U.S. Pat. No. 3,718,213 describes a wheel hub clutching mechanism utilizing a dial which moves an actuator nut to place springs under tension to move a clutch out of mesh with a shaft driven pinion. In this device when the dial is moved to a locked position, it moves the actuator nut to place the springs under compression, thus moving the clutch into mesh with the pinion. U.S. Pat. No. 3,753,479 is a cam and spring operated positive clutch which also has a dial but utilizes a threaded cam.

One object of the present invention is to provide a clutch which does not use a cam, but rather a series of shoulders.

Other objects and advantages of this invention will be apparent from the description and claims which follow taken together with the appended drawings.

SPECIFIC EXAMPLE OF INVENTION

Figure 1:
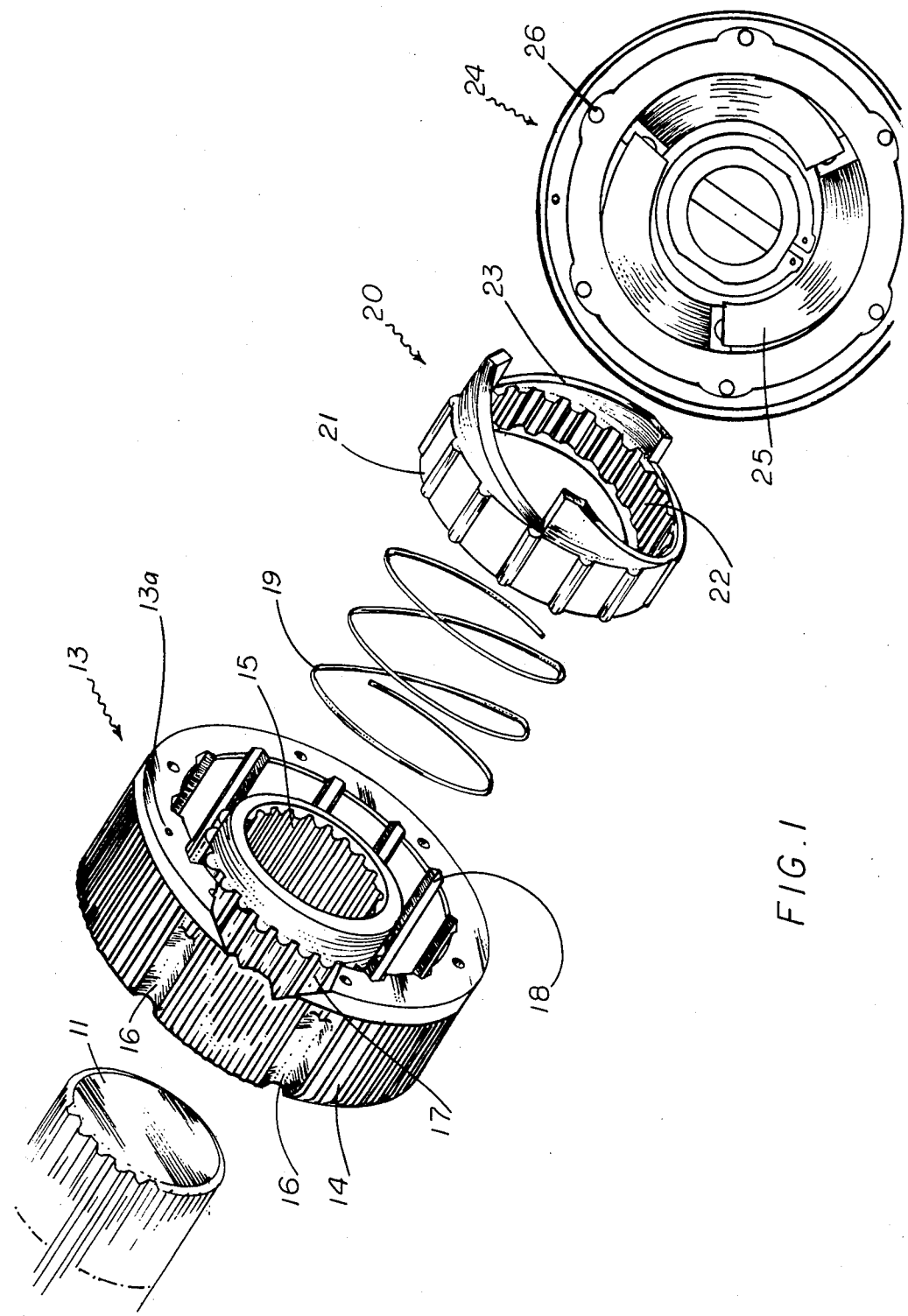
FIG. 1 is an exploded view showing the chief components of the invention in position to be attached to the hub of a vehicle.
Figure 2:
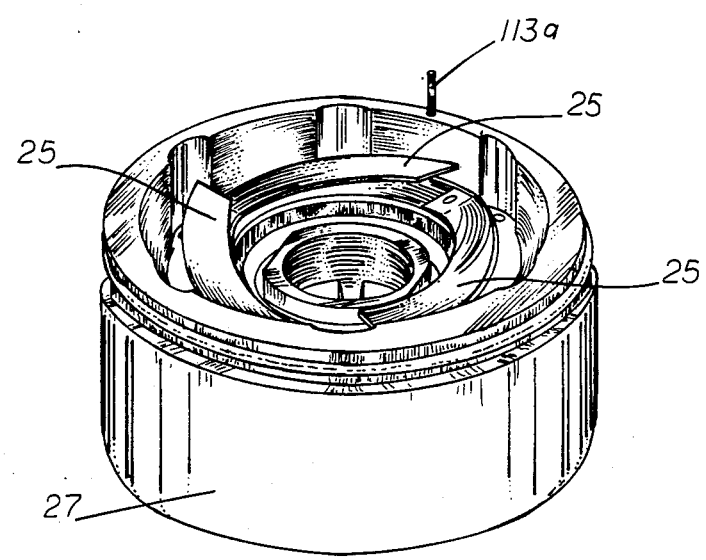
FIG. 2 is an interior view of the dial portion of the invention.
Figure 3:
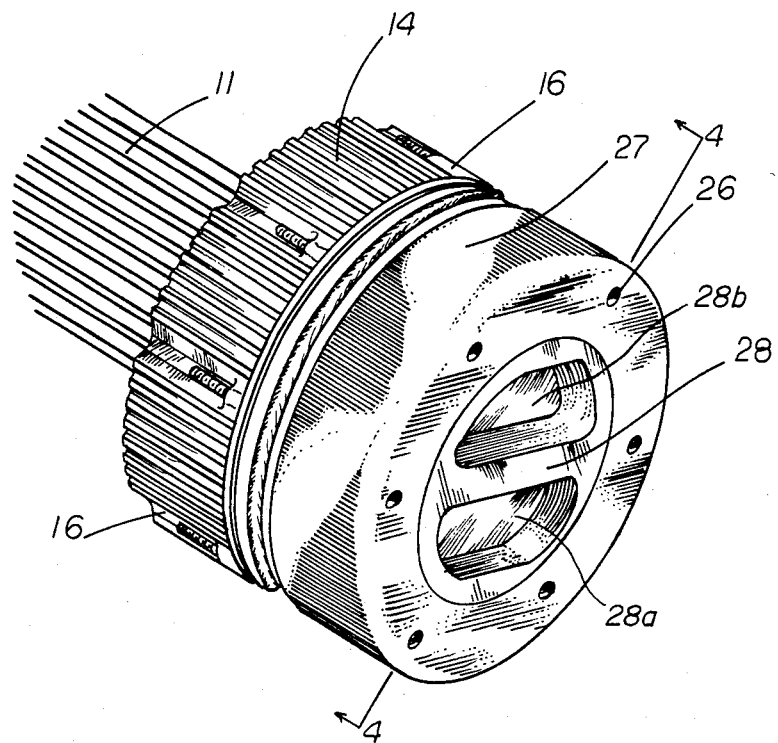
FIG. 3 is a view showing the device assembled onto the spline of the axle.
Figure 4:
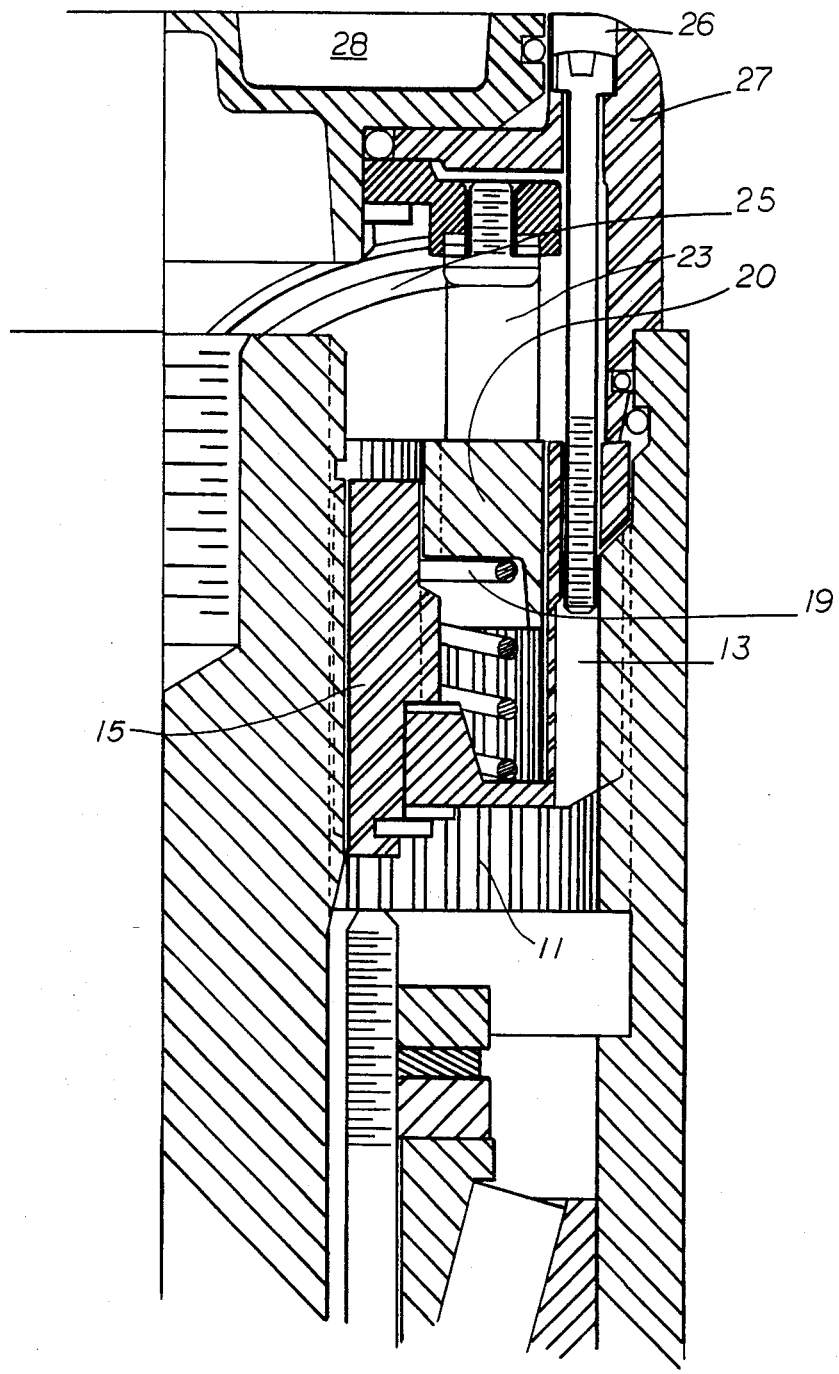
FIG. 4 is a section along line 4—4 of FIG. 3 showing the interrelationship of the various parts of the invention.
Figure 6:
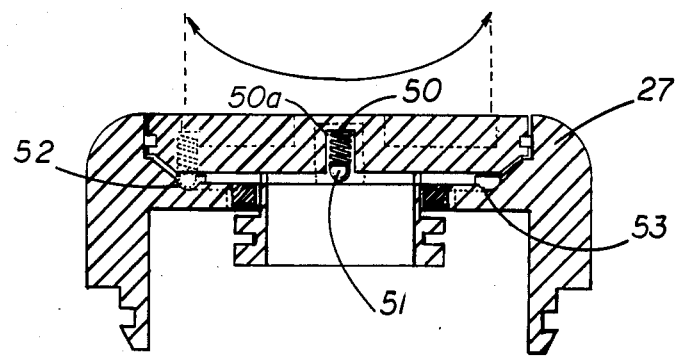
FIG. 6 is a combination view of sections along lines 7—7 and 8—8 in FIG. 5.
Figure 5:
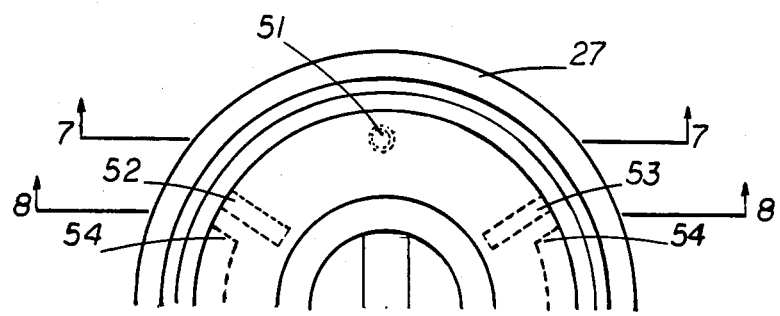
FIG. 5 is a partial bottom view of cap 27 with ramps removed.
Figure 7:
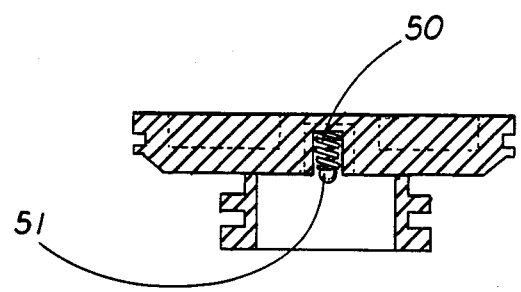
FIG. 7 is a view along line 7—7 of FIG. 5.
Figure 8:
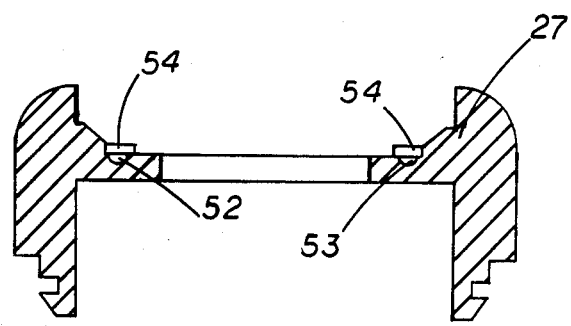
FIG. 8 is a view along line 8—8 of FIG. 5.

Referring now to the drawings, the chief action of the device is to control the connection of the body 13 to axle 11. This is accomplished by causing the unique clutch ring 20 to move forward or rearward so as to connect or disconnect body 13 to inner axle hub 15 which is carried by axle 11.

The axle 11 has a spline to which the device connects. The spline of axle 11 has longitudinal ridges and grooves which register with the inner longitudinal ridges and grooves of axle hub 15. Axle 11 is the drive axle or spline shaft spindle yoke. This shaft drives the front wheel and is connected to the transfer case. Body 13 has a longitudinal ridges and grooves or spline 14 on its outer surface as well as exterior cutouts 16 into which screws or pins fit. Pinholes 13a are provided in the body which register with pins 113a. The exterior spline 17 of hub 15 is registerable with the inner ribs or spline 22 of clutch ring 20. The ribs and grooves 18 on the interior anulus of the body register with the outer ribs and grooves 21 of ring 20. A coil spring 19 is positioned between the clutch ring 20 and the base of body 13.

Clutch ring 20 is characterized by inner and outer splines 22 and 21, and also by three rearward ramps 23 which are angular and serve to move and lock the device into a selected position when acitivated by dial 24. Dial 24 has leaf springs 25 which register with the ramps 23. Screw holes 26 are provided to permit assembly of the entire device with appropriate threaded screws. A handle portion 28 is provided on the dial.

When the clutch ring 20 is disengaged from the hub 15, the shaft 11 and inner axle 15 are stationary. When the dial 24 is given a one-third turn there is a rough alignment which puts pressure on the ramps of the clutch ring 20. When the vehicle moves proper alignment is achieved, with the engagement of the outside spline of inner axle hub 15 and the clutch ring 20. The leaf springs 25 push the clutch ring 20 into locked position so that the body 13 and shaft 11 now rotate.

Cap 27 includes a dial 28 having outer indentations 28a and 28b and on its inner side a socket 50a having a spring 50 terminating in a ball 51. As the dial is rotated, the motion of the ball is stopped by stop 54 and the spring pushes the ball into the selected locking notches 52 or 53. Rotation in one direction causes the leaf springs 25 to ascend the ramps 23 thus pushing clutch member 20 forward, while reverse causes retraction.

I claim:

1. A clutch to permit engagement and disengagement of a splined axle 11 with a power drive means 13 which has an inner axle hub 15, internally splined to engage with said axle and externally splined, and a body 14 with internal ridges and grooves 18 and external grooves and ridges connectable to a power source, comprising:

(a) a clutch ring 20 having exterior ridges and grooves 21, interior ridges and grooves 22 and a plurality of rearwardly extending ramps 23; wherein said exterior ridges and grooves 21 are engaged with said body internal ridges and grooves 18;

(b) a movable control body 24 having a plurality of forwardly extending leaf springs 25 registerable with said ramps; and (c) a spring 19 forward of said clutch ring; whereby rotation of said body 24 causes said clutch ring 20 to move forward so that its interior ridges and grooves 22 engage the inner axle hub 15 while reverse rotation causes the clutch ring 20 to move rearward so as to disengage.

* * * * *